(12) United States Patent
Kang et al.

(10) Patent No.: US 8,848,820 B2
(45) Date of Patent: Sep. 30, 2014

(54) APPARATUS AND METHOD FOR INTERFERENCE ALIGNMENT AND CANCELLATION IN WIRELESS COMMUNICATION SYSTEM

(71) Applicants: Samsung Electronics Co. Ltd., Suwon-si (KR); Korea University Research and Business Foundation, Seoul (KR)

(72) Inventors: Chung-Gu Kang, Seoul (KR); Xin Qu, Seoul (KR)

(73) Assignees: Samsung Electronics Co., Ltd., Suwon-si (KR); Korea University Research and Business Foundation, Seoul (KR)

(*) Notice: Subject to any disclaimer, the term of this patent is extended or adjusted under 35 U.S.C. 154(b) by 0 days.

(21) Appl. No.: 13/912,835

(22) Filed: Jun. 7, 2013

(65) Prior Publication Data

US 2013/0329822 A1 Dec. 12, 2013

(30) Foreign Application Priority Data

Jun. 9, 2012 (KR) ........................ 10-2012-0061842

(51) Int. Cl.
| | | |
|---|---|---|
| H04L 1/02 | (2006.01) |
| H04B 15/00 | (2006.01) |
| H04B 7/08 | (2006.01) |
| H04B 7/04 | (2006.01) |
| H04B 1/7107 | (2011.01) |

(52) U.S. Cl.
CPC ............ *H04B 7/0817* (2013.01); *H04B 7/0452* (2013.01); *H04B 1/71072* (2013.01)
USPC .......................................... 375/267; 375/285

(58) Field of Classification Search
USPC .................................................. 375/267, 285
See application file for complete search history.

(56) References Cited

U.S. PATENT DOCUMENTS

| | | | |
|---|---|---|---|
| 2012/0046038 A1 | 2/2012 | Gao et al. | |
| 2012/0058788 A1 | 3/2012 | Papadopoulos et al. | |
| 2013/0170533 A1* | 7/2013 | Khojastepour et al. | 375/227 |
| 2013/0301746 A1* | 11/2013 | Mobasher et al. | 375/267 |
| 2014/0003274 A1* | 1/2014 | Clerckx et al. | 370/252 |
| 2014/0036888 A1* | 2/2014 | Papadopoulos | 370/336 |

* cited by examiner

*Primary Examiner* — Don N Vo
(74) *Attorney, Agent, or Firm* — Jefferson IP Law, LLP (57) ABSTRACT

An apparatus and method for interference alignment and cancellation in a wireless communication system of a multi-user communication environment are provided. The apparatus includes a plurality of receivers, each receiver including a plurality of antennas for receiving signals from a plurality of transmitters. Each of the receivers detects signals of multiple users in a designed order and performs a specific interference alignment on the remaining signals. Also, each of the receivers transmits information about the detected user signal to other receivers to enable the other receivers to cancel the received user signal and perform a user signal detection and a specific interference alignment operation. Accordingly, it is possible to present various types of transmitter/receiver structures that can reduce the complexity while implementing the maximum capacity in an interference environment between a multi-user and single-user TX/RX pair.

19 Claims, 8 Drawing Sheets

APPARATUS AND METHOD FOR INTERFERENCE ALIGNMENT AND CANCELLATION IN WIRELESS COMMUNICATION SYSTEM

PRIORITY

This application claims the benefit under 35 U.S.C. §119(a) of a Korean patent application filed on Jun. 9, 2012 in the Korean Intellectual Property Office and assigned Serial No. 10-2012-0061842, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and Korea University Research and Business Foundation.

BACKGROUND OF THE INVENTION

1. Field of the Invention

The present invention relates to a wireless communication system. More particularly, the present invention relates to an apparatus and method for aligning and cancelling interference of a transmit/receive (TX/RX) signal.

2. Description of the Related Art

In a wireless communication system, an Interference Alignment (IA) technique prevents interference on a desired user signal by causing the user signal and an interference signal to use different transmission spaces provided by multiple TX/RX antennas when K interfering TX/RX pairs share the same resource for transmission. In this case, a plurality of interference signals are aligned to minimize the occupied space. In order that a desired signal can be decoded successfully, the transmission of each TX/RX pair has to save enough signal space for accommodating the aligned interferences and the remaining signal space is for user signal.

Therefore, the capacity of IA schemes discussed in the documents of the related art depends on the effect of interference mitigation which is restricted to the number of TX/RX antennas. There is a need for an interference alignment and cancellation scheme involving new receiver architecture to enhance the capability of eliminating interferences with finite number of TX/RX antennas in practical scenario.

In the related research, it is known that, solving the maximum total achievable Degree of Freedom (DoF) for IA scheme is NP-hard for general system configurations (the number of TX/RX pairs K, the number of TX/RX antennas $M_k/N_k$, and the number of transmitted packets $d_k$ for each TX/RX pair k). The maximum total achievable DoF is known only for symmetric system configurations where each of K TX/RX pairs having $M_k=M$ TX antennas and $N_k=N$ RX antennas coexist as well as $d_k=d$. The maximum total achievable DoF is given as $(M+N)\cdot K/(K+1)$. Particularly, in the case of K=3 and N=M, the capacity corresponding to the maximum value can be implemented, and this is given as 1.5M.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method to implement interference alignment and cancellation in a wireless communication system of a multi-user communication environment.

Another aspect of the present invention is to provide an apparatus and method that can operate even in a multi-user interference channel when simultaneously transmitting signals from a plurality of users to one receiver while using an interference alignment and cancellation scheme in a wireless communication system.

Another aspect of the present invention is to provide an apparatus and method to implement interference alignment and cancellation in a wireless communication system of a multi-user communication environment in which the number of TX antennas is different from the number of RX antennas and the number of transmitted packets at each user is different.

Another aspect of the present invention is to provide an apparatus and method that can secure a degree of freedom of 2M when the number of TX antennas is M, the number of RX antennas is M, and the number of transmitted packets at each user is different in a wireless communication system of a multi-user communication environment.

Another aspect of the present invention is to provide an apparatus and method for minimizing the number of packets that are to be exchanged between receivers, in implementing a transmitter/receiver structure that can secure a degree of freedom of 2M when the number of TX antennas is M and the number of RX antennas is M, and the number of transmitted packets at each user is different in a wireless communication system.

In accordance with an aspect of the present invention, an apparatus for Interference Alignment and Cancellation (IAC) in a wireless communication system is provided. The apparatus includes a plurality of receivers, each receiver including a plurality of antennas for receiving signals from a plurality of transmitters. Each of the receivers detects signals of multiple users in a designed order and performs a specific interference alignment scheme on the remaining signals. Also, each of the receivers transmits information about the detected user signal to other receivers to enable the other receivers to cancel the received user signal and perform a user signal detection and a specific interference alignment operation.

In accordance with another aspect of the present invention, a method for IAC in a wireless communication system is provided. The method includes generating IAC graphs including nodes and connection lines, searching and selecting an IAC graph having subgraphs, in which nodes in each subgraph constitute up to one loop, among the generated IAC graphs, and determining a packet detection and cancellation process from linear equations presented by the selected IAC graph. Each of the nodes indicates a pre-coding vector, and each of the connection lines indicates whether to perform a specific interference alignment scheme between the pre-coding vectors of the corresponding nodes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Exemplary embodiments described below propose a transmitter/receiver structure and a method thereof for maximizing the system capacity by an interference alignment and cancellation scheme in a Gaussian interference channel in which interference is present between a plurality of TX/RX pairs, when a plurality of users simultaneously transmit signals to one receiver in an uplink by using a plurality of antennas.

<Interference Alignment and Cancellation (IAC) Scheme>

A. MAC System Model

Figure 1:
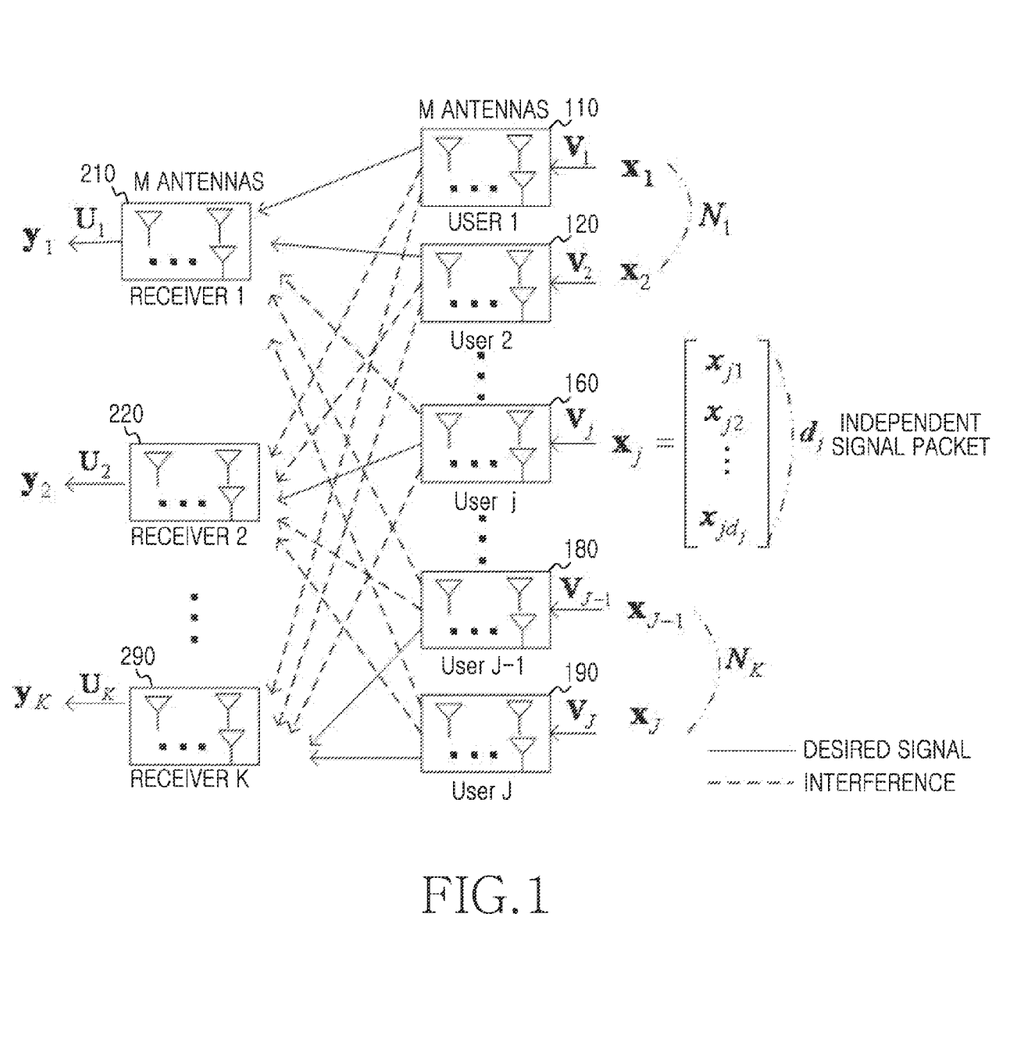
FIG. 1 is a diagram illustrating a model of a wireless communication system in an interference channel environment of a multi-user transmitter/receiver pair according to an exemplary embodiment of the present invention.

FIG. 1 is a diagram illustrating a model of a wireless communication system in an interference channel environment of a multi-user transmitter/receiver pair according to an exemplary embodiment of the present invention.

Referring to FIG. 1, a fundamental system model includes K receivers 210, 220, . . . , 290 using M antennas that communicate with a plurality of transmitters 110, 120, . . . , 160, . . . , 180 and 190 using M antennas. Assuming that the number of users communicating with the k-th receiver 290 is $N_k$, the j-th user 190 simultaneously transmits $d_j$ packets by multiplexing. Packets transmitted by the j-th user 190 are represented by $\{x_{ji}\}_{i=1}^{d_j}$, and the packets are transmitted by the M antennas after pre-coding is performed by a matrix $V_j$ for interference alignment. A transmission system operating in a Multiple Access Channel (MAC) in which a plurality of users simultaneously transmits signals to one receiver is referred to as a MAC system.

It is assumed that the receivers of FIG. 1 can exchange detected packets (i.e., symbols) with each other in any way in an IAC reception scheme. When receivers can exchange detected packets with each other, another receiver receiving a detected signal from a receiver cancels the detected signal, thereby making it possible to more flexibly align an interference that can be provided by multiple antennas. Accordingly, the degree of freedom can be improved.

When an IAC scheme is implemented in the system of FIG. 1, a receiver structure that can always implement a degree of freedom of 2M can be presented, and this is a value greater than a degree of freedom of 2M·K/(K+1) (that can be implemented by the IA scheme of the related art. Also, among a plurality of possible receiver structures that can implement this capacity, a structure for minimizing an overhead necessary for packet exchange between receivers can be designed.

B. Example of Implementation of IAC Scheme

Figure 2:
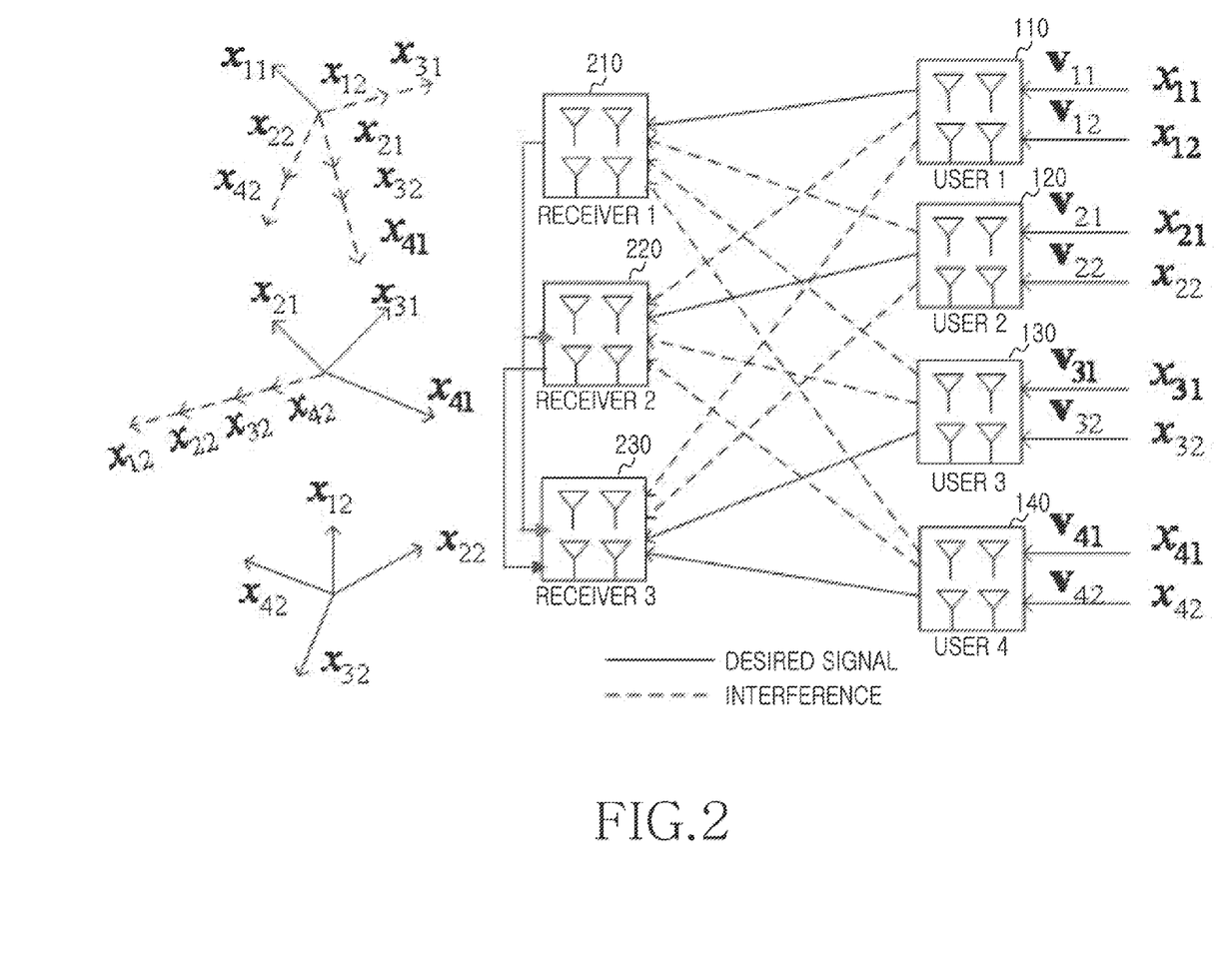
FIG. 2 is a diagram illustrating a structure for detecting a user signal according to an Interference Alignment and Cancellation (IAC) process in a transmitter and a receiver according to an exemplary embodiment of the present invention.

FIG. 2 is a diagram illustrating a structure for detecting a user signal according to an IAC process in a transmitter and a receiver according to an exemplary embodiment of the present invention.

Referring to FIG. 2, a reception process for performing interference alignment and cancellation in the case of K=3, M=4, J=4 is illustrated. Herein, K denotes the number of receivers, M denotes the number of antennas, and J denotes the number of users (or transmitters). In the structure of FIG. 2, receivers 210, 220, and 230 using M antennas communicate with a plurality of transmitters 110, 120, 130 and 140. The packet detection and interference alignment processes in the respective receivers 210, 220 and 230 are as follows. In this structure, the first receiver 210 detects only a packet $x_{11}$, and the remaining packets are aligned throughout the remaining three dimensions. The detected $x_{11}$ is transmitted to the second receiver 220 and the third receiver 230. The second receiver 220 cancels a signal corresponding to $x_{11}$ from the received signals and then detects $x_{21}, x_{31}, x_{41}$ transmitted in different dimensions, and the remaining interference signals are aligned in the remaining one dimension. Herein, all of the detected packets $x_{21}, x_{31}, x_{41}$ are transmitted to the third receiver 230, cancelled in the third receiver 230, and the packets $x_{12}, x_{22}, x_{32}, x_{42}$ undetected until now are detected last. Herein, since $x_{12}$ among the detected packets is to be received by the first receiver 210, it is transmitted to the first receiver 210. Also, since $x_{22}$ is to be received by the second receiver 220, it is transmitted to the second receiver 220. As can be seen from this TX/RX structure, a total of eight packets can be simultaneously transmitted in the entire system, and a total degree of freedom of 8 can be implemented. Since the IA scheme of the related art can provide a total degree of freedom of 6, it can be seen that the exemplary IAC scheme can provide higher capacity than the IA scheme of the related art.

Meanwhile, it can be seen that a total of seven packets are to be exchanged between receivers in this reception structure.

As illustrated in FIG. 2, while each receiver can detect a packet that is to be received by the receiver, the packet can also be transmitted to the receiver after being detected by another receiver. Also, interference varies when an alignment is performed in each receiver according to which receiver detects which packet and an interference cancellation effect varies according to a structure of transmitting a detected packet to another receiver. That is, the possibility of interference alignment is determined according to the signal detection and interference cancellation process in each receiver. Also, although interference alignment is theoretically possible, the degree of freedom in implementation possibility may vary. Exemplary embodiments of the present invention present a method for designing a transmitter/receiver structure that can perform a specific interference alignment scheme when an IAC scheme is used in the system of FIG. 1, and can always implement a degree of freedom of 2M regardless of the number of receivers. Also, among the transmitter/receiver structures designed as above, exemplary embodiments of the present invention present a transmitter/receiver structure that can minimize the number of packets that are to be exchanged between receivers.

C. Method for Designing Implementable IAC Receiver

In order to determine a reception structure that is to implement an IAC in the system of FIG. 1, a pre-coding vector in a transmitter and a user signal detection and interference alignment process in a receiver are to be determined simultaneously. The conditions that are to be satisfied for the specific interference alignment scheme in the receiver k are represented by $\Phi_k$, and the interference alignment conditions are given as a plurality of linear equations. First, in FIG. 1, the channel between an antenna of the user j and an antenna of the receiver k is represented by an M×M matrix $H_{kj}$, and the $l_j$-th packet $x_{jl_j}$ of the user j is pre-coded by an M×1 vector $v_{jl_j}$. First, since packets of the same user cannot be aligned in the same receiver, the following Equation (1) should be satisfied.

$$\Phi_k: \{\text{span}(H_{kj}v_{jl_j}) \neq \text{span}(H_{kp}v_{pi_p}), j \neq p\} \quad \text{Equation (1)}$$

In the MAC system illustrated in FIG. 2, since $x_{12}$ and $x_{31}$ are aligned in the same space in the first receiver 210, an Equation of $\text{span}(H_{11}v_{12})=\text{span}(H_{13}v_{31})$ should be satisfied. Meanwhile, since $x_{21}$, $x_{32}$, and $x_{41}$ are aligned in a different space in the first receiver 210, equations of $\text{span}(H_{12}v_{21})=\text{span}(H_{13}v_{32})$ and $\text{span}(H_{12}v_{21})=\text{span}(H_{14}v_{41})$ should be satisfied simultaneously. Lastly, since $x_{22}$ and $x_{42}$ are aligned in the final space in the first receiver 210, an equation of $\text{span}(H_{11}v_{12})=\text{span}(H_{13}v_{31})$ should be satisfied. Likewise, in the second receiver 220, since $x_{21}$, $x_{31}$, $x_{41}$ is detected and $x_{12}$, $x_{22}$, $x_{32}$, $x_{42}$ is aligned in the final space, three equations $\text{span}(H_{21}v_{12})=\text{span}(H_{22}V_{22})$ $\text{span}(H_{22}v_{22})=\text{span}(H_{23}v_{32})$ and $\text{span}(H_{23}v_{32})=\text{span}(H_{24}V_{42})$ should be satisfied simultaneously. Also, in the third receiver 230, since four symbols are transmitted in four spaces, separate interference alignment is unnecessary.

When there is a solution that simultaneously satisfies a set $\Psi=\{\Phi_k\}_{k=1}^K$ of linear equations given by Equation (1), a desired IAC receiver can be implemented, and a TX/RX structure so implemented secures a degree of freedom of 2M. Herein, an exemplary receiver structure having a solution for securing a degree of freedom of 2M can be determined by using a graph. That is, the graph includes nodes and connection lines, each of the nodes indicates a pre-coding vector, and each of the connection lines indicates whether to perform interference alignment between the pre-coding vectors of the corresponding nodes. That is, with respect to the packets that are interference-aligned, connection lines are provided between the corresponding nodes. A graph generated by repetition of this interference alignment process is referred to as an IAC graph. The IAC graph may include a plurality of subgraphs (the subgraphs are graphs that are present independently without being connected to each other). When the nodes in each subgraph of the generated IAC graph are designed to constitute one loop, an IAC scheme configured according to the IAC graph can be implemented, and a degree of freedom of 2M is provided. By solving the linear equations presented by the designed IAC graph, a pre-coding vector of the transmitter can be determined, and a packet detection and cancellation process in each receiver is determined.

D. Exemplary Configuration of IAC Graph

Figure 3A:
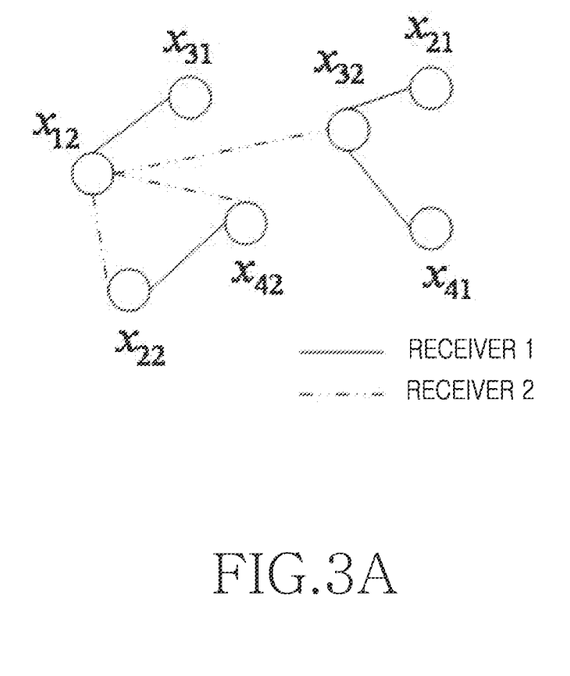
FIGS. 3A and 3B are diagrams illustrating IAC graphs for an IAC operation by a transmitter and a receiver according to an exemplary embodiment of the present invention.
Figure 3B:
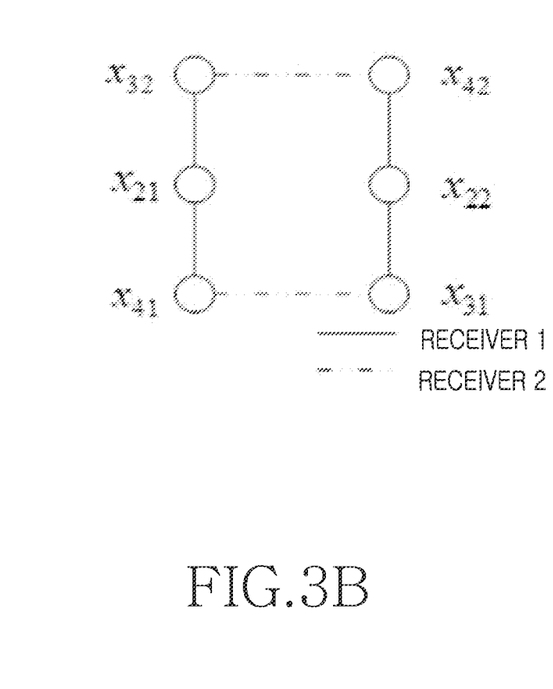

FIGS. 3A and 3B are diagrams illustrating IAC graphs for an IAC operation by a transmitter and a receiver according to an exemplary embodiment of the present invention. In the drawings, a solid line represents the first receiver, and a broken line represents the second receiver.

FIG. 3A is an IAC graph for the receiver structure illustrated in FIG. 2. In this case, it can be seen that the first receiver 210 detects $x_{11}$, the second receiver 220 detects $x_{21}$, $x_{31}$, $x_{41}$ and the third receiver 230 detects $x_{12}$, $x_{22}$, $x_{32}$, $x_{42}$. However, there may be more than one receiver structure that can implement a degree of freedom of 2M. For example, it can be seen that FIG. 3B is yet another IAC graph corresponding to an implementable receiver structure (that is, the IAC graph includes one subgraph, and the subgraph includes only one loop). In this receiver structure, it can be seen that the first receiver 210 detects $x_{11}$, $x_{12}$, the second receiver 220 detects $x_{21}$, $x_{22}$ and the third receiver 230 detects $x_{31}$, $x_{32}$, $x_{41}$, $x_{42}$.

E. Signaling for MAC System Operation

Figure 4:
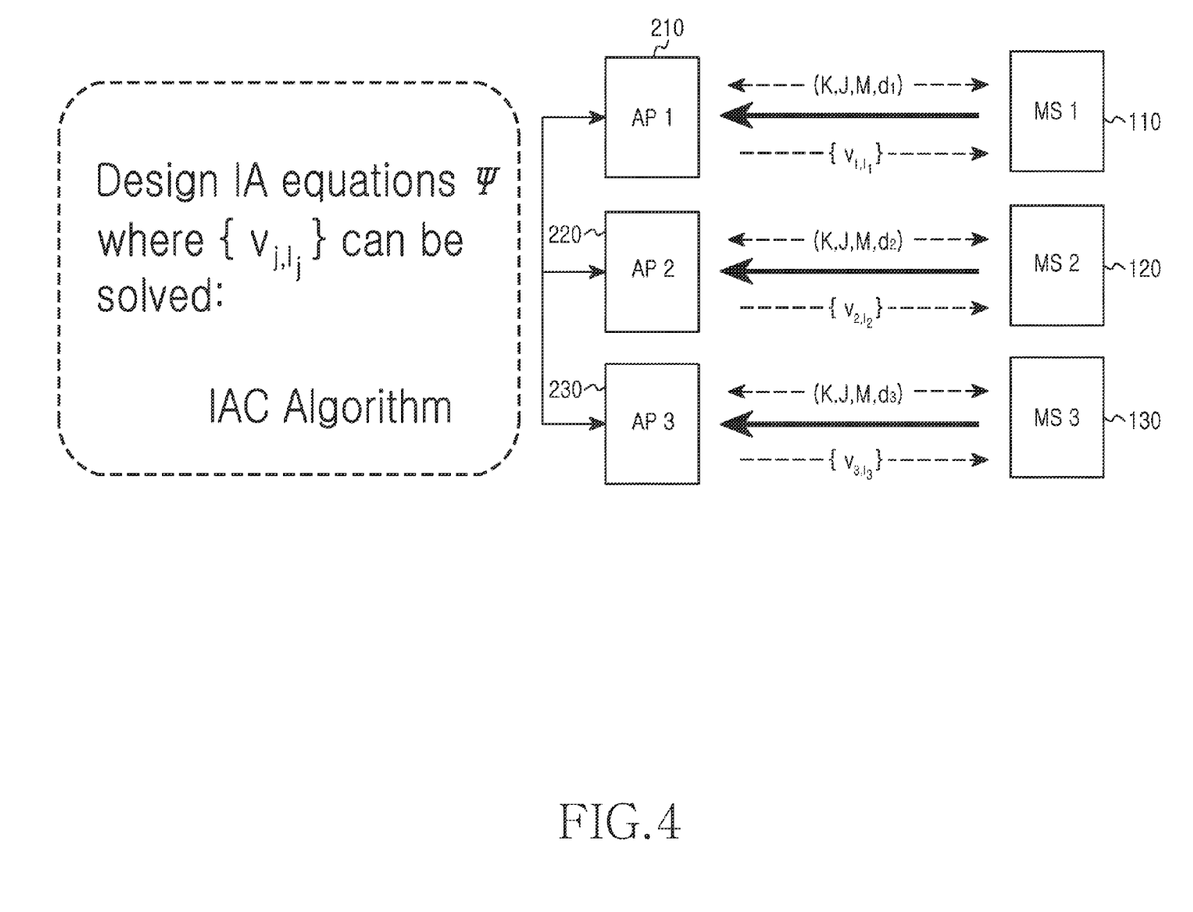
FIG. 4 is a diagram illustrating a signaling operation for IAC between a transmitter and a receiver according to an exemplary embodiment of the present invention.

FIG. 4 is a diagram illustrating a signaling operation for IAC between a transmitter and a receiver according to an exemplary embodiment of the present invention.

Referring to FIG. 4, for the operation of the MAC system operating as above, system parameters K, J and M and a multiplexing factor $\{d_j\}_{j=1}^K$ for each user should be exchanged between the transmitters 110, 120 and 130 and the receivers 210, 220 and 230. Also, the receiver should transmit the pre-coding vectors determined by the above designing process to the corresponding transmitter. This process is illustrated in FIG. 4.

F. Receiver Design Considering Minimum Information Exchange Between Receivers

As can be seen from the illustration of FIGS. 3A and 3B, various types of structures capable of implementing a degree of freedom of 2M can be present when an IAC transmitter/receiver is designed in the MAC system of the same condition. A criterion for selecting one of the plurality of transmitter/receiver structures can be considered. In exemplary embodiments of the present invention, a transmitter/receiver structure minimizing the number of exchanges of a detected packet between the respective receivers is selected among the plurality of transmitter/receiver structures. For example, among two structures presented in the illustration of FIGS. 3A and 3B, a total of seven packet exchanges are performed in the receiver structure corresponding to FIG. 3A, and a total of six packet exchanges are performed in the receiver structure corresponding to FIG. 3B. Therefore, since the structure of FIG. 3B requires fewer packet structures, this structure can be selected. In actuality, the structure minimizing the number of packets to be exchanged between receivers can be searched and selected among all the possible TX/RX structures.

Meanwhile, there may be numerous IAC TX/RX structures that can implement a degree of freedom of 2M with respect to a random MAC system. Among the structures, the complexity in searching the structure requiring the fewest packet exchanges may be very high. If the parameters of the MAC system (e.g., the number of receivers and the number of users that connect simultaneously) change dynamically, it is impossible to search this structure every time. Exemplary embodiments of the present invention present a method for reducing the search complexity.

A set of signal packets detected in the receiver k is represented by $D_k$. The number of signal packets that are not yet detected in the receiver k among the packets transmitted by the user j is represented by $s_u^{[k,j]}$. Also, the number of packets to be exchanged between the respective receivers is determined by the IAC transmitter/receiver structure, and this is a function of $\{D_k\}_{k=1}^K$. Therefore, the number of packets to be exchanged between the respective receivers is represented by $C_{sys}(D_1, D_2, \ldots, D_{K-1}, D_K)$. Since determination of an IAC TX/RX structure $\{D_k\}_{k=1}^K$ minimizing $C_{sys}(D_1, D_2, \ldots D_{K-1}, D_K)$ requires too high of a search complexity, exemplary embodiments of the present invention determine the IAC TX/RX structure according to a simplified process as described below.

$$D_k^* = \underset{D_k}{\arg\min}\, C_{sys}(D_1^*, D_2^*, \ldots, D_{k-1}^*, D_k) \quad \text{Equation (2)}$$

$$\text{s.t.} \max_{j=1,2,\ldots,J} \{s_u^{[k,j]}\} \leq dim(I_k)$$

In Equation (2), $I_k$ denotes a space in which an interference signal is present in the receiver k, and $dim(I_k)$ denotes a dimension of the space.

According to exemplary embodiments of the present invention described above, when an IAC scheme is implemented in the system, a receiver structure that can always implement a degree of freedom of 2M can be presented, which is a value greater than a degree of freedom of 2M·K/(K+1) that can be implemented by the IA scheme of the related art. Also, among a plurality of possible receiver structures that can implement this capacity, a structure for minimizing an overhead necessary for packet exchange between receivers can be designed.

That is, exemplary embodiments of the present invention provide a TX/RX system that can operate even in a multi-user interference channel when simultaneously transmitting signals from a plurality of users to one receiver while using an IAC scheme. In this case, even when the number of TX antennas is different from the number of RX antennas, the concept can be expanded in the same manner. Also, exemplary embodiments of the present invention provide a condition for designing a receiver structure that can secure a degree of freedom of 2M when the number of TX antennas is M and the number of RX antennas is M. A degree of freedom of 2M can be implemented when a TX/RX structure is designed such that each subgraph of the IAC graph has up to one loop. Also, exemplary embodiments of the present invention provide a transmitter/receiver structure for minimizing the number of packets that are to be exchanged between receivers, among the possible transmitter/receiver structures. Also, exemplary embodiments of the present invention can reduce the complexity in searching a transmitter/receiver structure by Equation (2) and can minimize the number of packets that are to be exchanged between receivers, while providing a degree of freedom of 2M. Also, exemplary embodiments of the present invention can change the transmitter/receiver structure dynamically even when the values J, K and M change.

<Interference Alignment and Partial Cancellation (IAPC) Scheme>

A. MIMO Interference Channel and System Model

Figure 5:
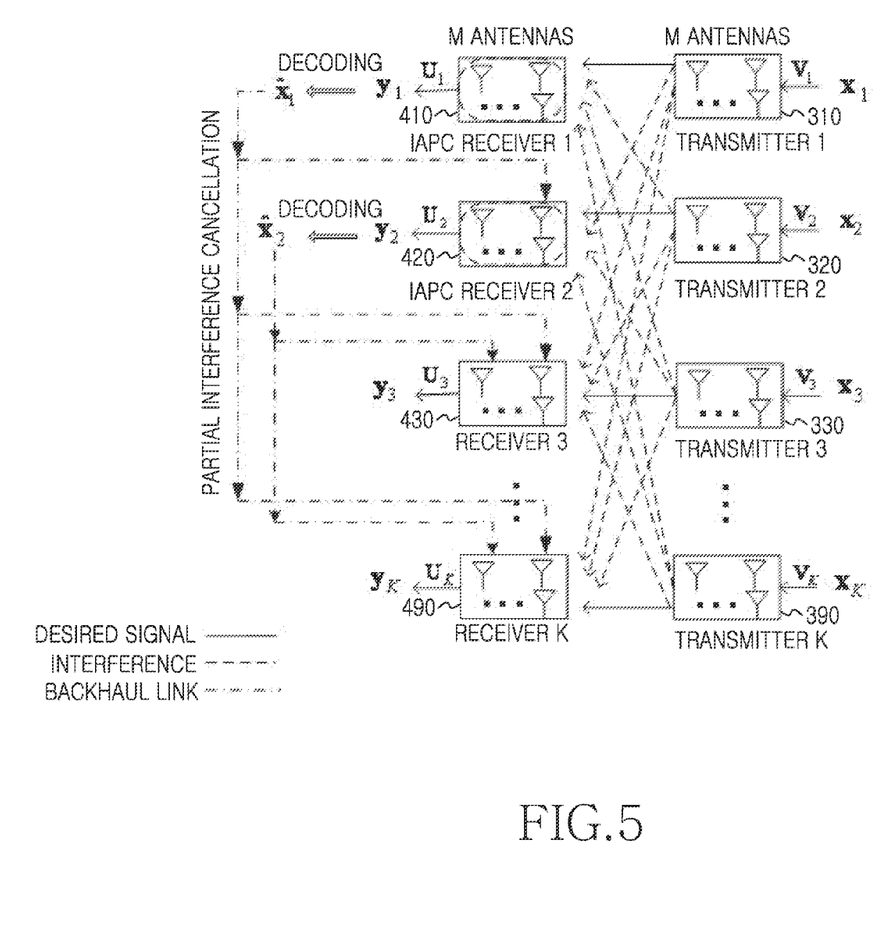
FIG. 5 is a diagram illustrating a model of a wireless communication system in an interference channel environment of a single-user transmitter/receiver pair according to an exemplary embodiment of the present invention.

FIG. 5 is a diagram illustrating a model of a wireless communication system in an interference channel environment of a single-user transmitter/receiver pair according to an exemplary embodiment of the present invention.

Referring to FIG. 5, a TX/RX structure that can implement a degree of freedom of 2M when applying an IAC scheme in a single-user interference channel environment in which receivers 410, 420, 430, . . . , 490 communicate with one user 310, 320, 330, . . . , 390 is illustrated. In FIG. 5, packets transmitted by the j-th user (transmitter) are represented by a $d_j \times 1$ vector $x_j$, and this is given by $d_j$ packets $\{x_{j1}, x_{j2}, \ldots, x_{jd_j}\}$. Meanwhile, each packet $x_j$ is transmitted through M antennas after pre-coding is performed by an $M \times d_j$ matrix $V_j$. In general, a receiver applying an IAC scheme has a complexity problem in that detected information should be exchanged between receivers. Also, in order to minimize the signal information exchange, an optimal structure should be derived according to given system parameters, and the complexity corresponding to the design varies according to the system parameters. Exemplary embodiments of the present invention present a structure for providing a substantially constant level of complexity in the information exchange between receivers regardless of the system parameters in the system of FIG. 5. More specifically, exemplary embodiments of the present invention present a TX/RX structure that can implement a degree of freedom of 2M by always transmitting packets detected by only two receivers 410 and 420 to other receivers 430, . . . , 490, regardless of the total number of receivers.

When an IAC scheme is implemented in the system of FIG. 5, since the same TX/RX structure having a substantially constant complexity without applying a new TX/RX structure whenever the system parameters change can be used, a system providing a low complexity while implementing the maximum possible degree of freedom (2M) can be implemented.

Among the receivers detecting packets of their users, specific receivers transmitting the detected packets to other receivers are referred to as Interference Alignment and Partial Cancellation (IAPC) receivers 410 and 420, and the number of IAPC receivers in the entire system is represented by $k_{IAPC}$. FIG. 5 illustrates the case of $k_{IAPC}=2$.

B. Example of IAC Scheme

Figure 6:
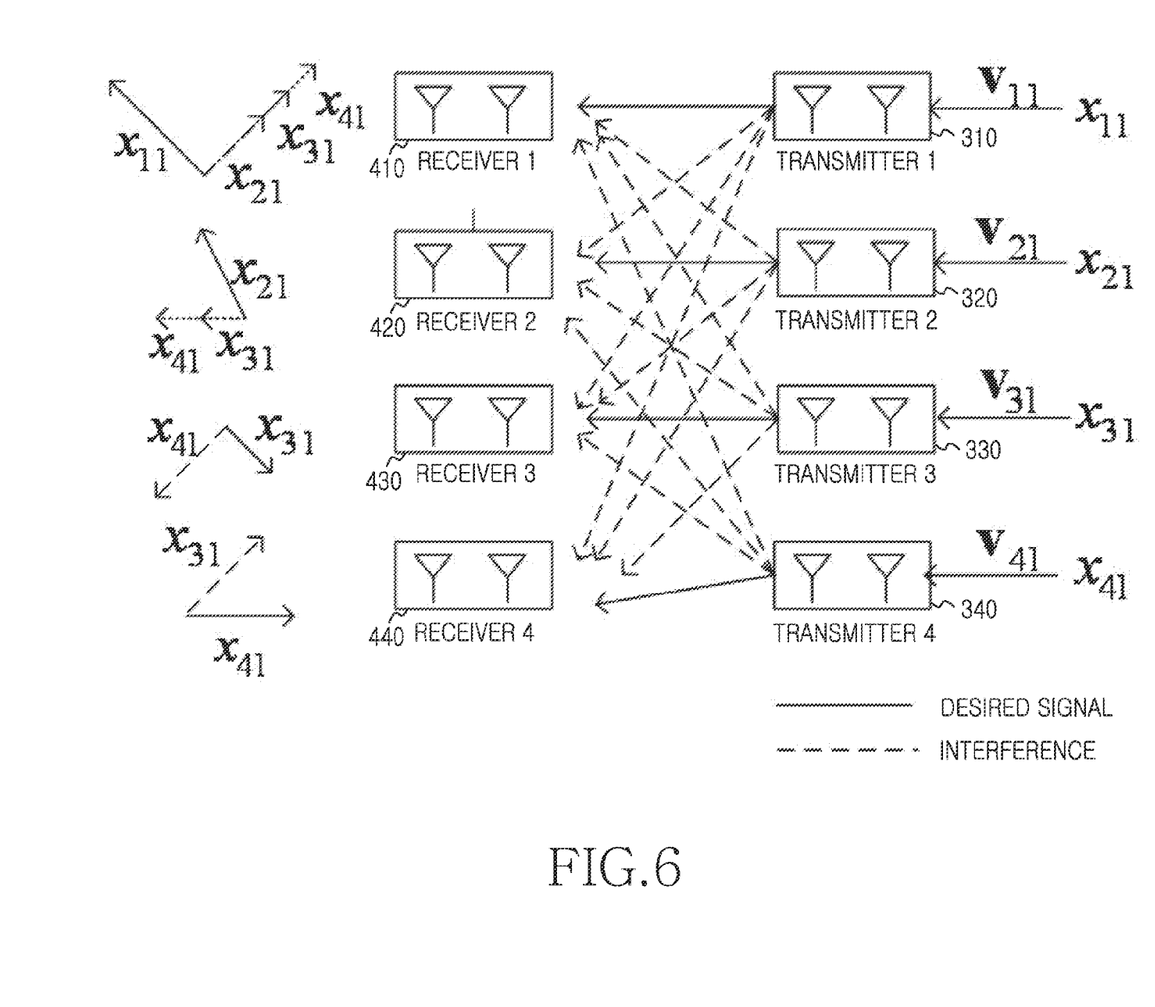
FIG. 6 is a diagram illustrating a structure for detecting a user signal according to an IAC process in a transmitter and a receiver according to an exemplary embodiment of the present invention.

FIG. 6 is a diagram illustrating a structure for detecting a user signal according to an IAC process in a transmitter and a receiver according to an exemplary embodiment of the present invention.

Referring to FIG. 6, an IAC scheme in an interference channel in the case of K=4, M=4, and $d_1=d_2=d_3=d_4=1$, and an example of $k_{IAPC}=2$ are illustrated. In FIG. 6, receivers 410, 420, 430, and 440 communicate with users 310, 320, 330, and 340. There is no problem in a general description even when first to $k_{IAPC}$-th receivers among K receivers are designated as IAPC receivers. Therefore, in the following description, it is assumed that the $k_{IAPC}$ receivers operate as IAPC receivers. Accordingly, in FIG. 6, the first receiver 410 and the second receiver 420 correspond to IAPC receivers. Therefore, the remaining receivers 430 and 440 need not transmit any detected packet to other receivers. In this illustration, it can be seen that four packets can be simultaneously transmitted and a degree of freedom of 4 is implemented. This is a value equal to the maximum degree of freedom of 2M that can be implemented in a general IAC RX structure. That is, by properly designating IAPC receivers and designing a suitable TX/RX structure, the number of packets to be exchanged between receivers can be maintained below a predetermined level while implementing the maximum degree of freedom.

The channel between an antenna of the user j and an antenna of the receiver k is represented by an M×M matrix $H_{kj}$. Signals of the receiver k received from the remaining transmitters except its own transmitter k act as interference, and a space they occupy is represented by $I_k = \{H_{kj}v_{jl}\}_{j \neq k}$ (l'=1, 2 ... $d_j$). Meanwhile, a signal space of the transmitter k is represented by $S_k = \{H_{kk}v_{kl}\}$ (l=1, 2 ... $d_k$).

C. Method for Designing Implementable IAC Receiver

In order to determine a reception structure for implementation of IAC in the system of FIG. 5, a pre-coding vector in a transmitter and a user signal detection and interference alignment process in a receiver are to be determined simultaneously. The conditions that are to be satisfied for interference alignment in the receiver k are represented by $\Phi_k$ and the interference alignment conditions are given as a plurality of linear equations. First, in FIG. 5, the channel between an antenna of the user j and an antenna of the receiver k is represented by an M×M matrix $H_{kj}$, and the $l_j$-th packet $x_{jl_j}$ of the user j is pre-coded by an M×1 vector $v_{jl_j}$. First, since packets of the same user cannot be aligned in the same receiver, the following Equation (3) should be satisfied.

$$\Phi_k: \{\text{span}(H_{kj}v_{jl_j}) = \text{span}(H_{kp}v_{pl_p}), j \neq p\} \quad \text{Equation (3)}$$

Exemplary embodiments of the present invention present a transmitter/receiver structure that can implement a degree of freedom of 2M while always having only two IAPC receivers 410 and 420 regardless of the number of TX/RX pairs when $k_{IAPC}=2$ in the system of FIG. 5. In the transmitter/receiver structure, it is assumed that a degree of freedom provided by IAPC receivers among the total degree of freedom 2M is M, and a degree of freedom provided by the remaining receivers is M. That is, when the degree of freedom provided by the IAPC receivers is $DOF_1$ and the degree of freedom provided by the remaining receivers is $DOF_2$, $DOF_1=M$ and $DOF_2=M$ and therefore the total degree of freedom is $DOF_1+DOF_2=2M$.

When there is a solution that simultaneously satisfies a set $\Psi = \{\Phi_k\}_{k=1}^{K}$ of linear equations given by Equation (3), a desired IAC receiver can be implemented, and a TX/RX structure so implemented secures a degree of freedom of 2M. Herein, an exemplary receiver structure having a solution for securing a degree of freedom of 2M can be determined by using a graph. That is, the graph includes nodes and connection lines, each of the nodes indicates a pre-coding vector, and each of the connection lines indicates whether to perform interference alignment between the pre-coding vectors of the corresponding nodes. That is, with respect to the packets that are interference-aligned, connection lines are provided between the corresponding nodes. A graph generated by repetition of this interference alignment process is referred to as an IAC graph. The IAC graph may include a plurality of subgraphs (the subgraphs are graphs that are present independently without being connected to each other). When the nodes in each subgraph of the generated IAC graph are designed to constitute one loop, an IAC scheme configured according to the IAC graph can be implemented, and a degree of freedom of 2M is provided. By solving the linear equations presented by the designed IAC graph, a pre-coding vector of the transmitter can be determined, and a packet detection and cancellation process in each receiver is determined.

D. IAC Graph that can Implement DoF of 2M in TX/RX Structure of IAC Scheme

Figure 7:
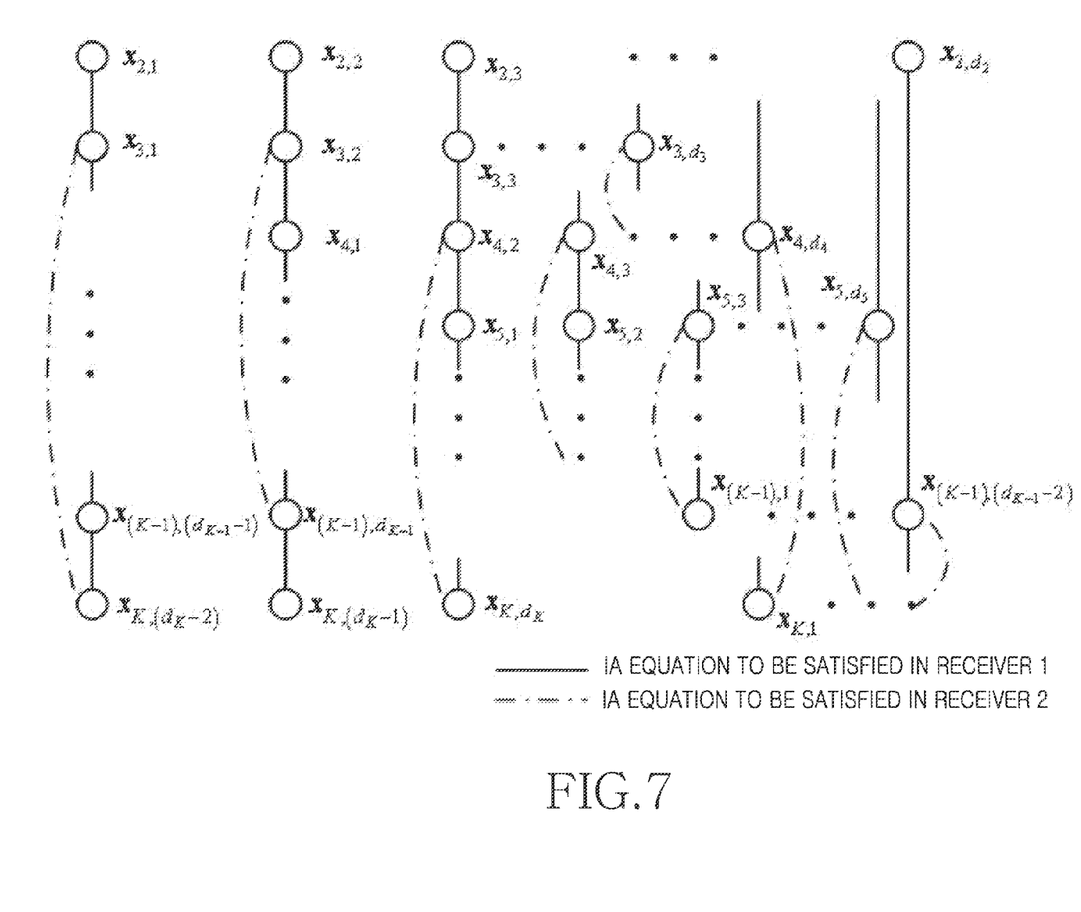
FIG. 7 is a diagram illustrating an IAC graph for an IAC operation by a transmitter and a receiver according to an exemplary embodiment of the present invention.

FIG. 7 is a diagram illustrating an IAC graph for an interference alignment and cancellation operation by a transmitter and a receiver according to an exemplary embodiment of the present invention.

Referring to FIG. 7, a solid line represents an IA equation to be satisfied in the first receiver, and a broken line represents an IA equation to be satisfied in the second receiver.

A transmitter/receiver structure that can implement a degree of freedom of WM while simultaneously satisfying the conditions of linear equations $\Psi = \{\Phi_k\}_{k=1}^{K}$ and $DOF_1+DOF_2=2M$ given by Equation (3) is given by the IAC graph of FIG. 7. As can be seen from FIG. 7, since all subgraphs have up to one loop, a transmitter/receiver designed by this IAC graph can implement a degree of freedom of 2M.

E. IAC Receiver Design and Operational Process

Figure 8:
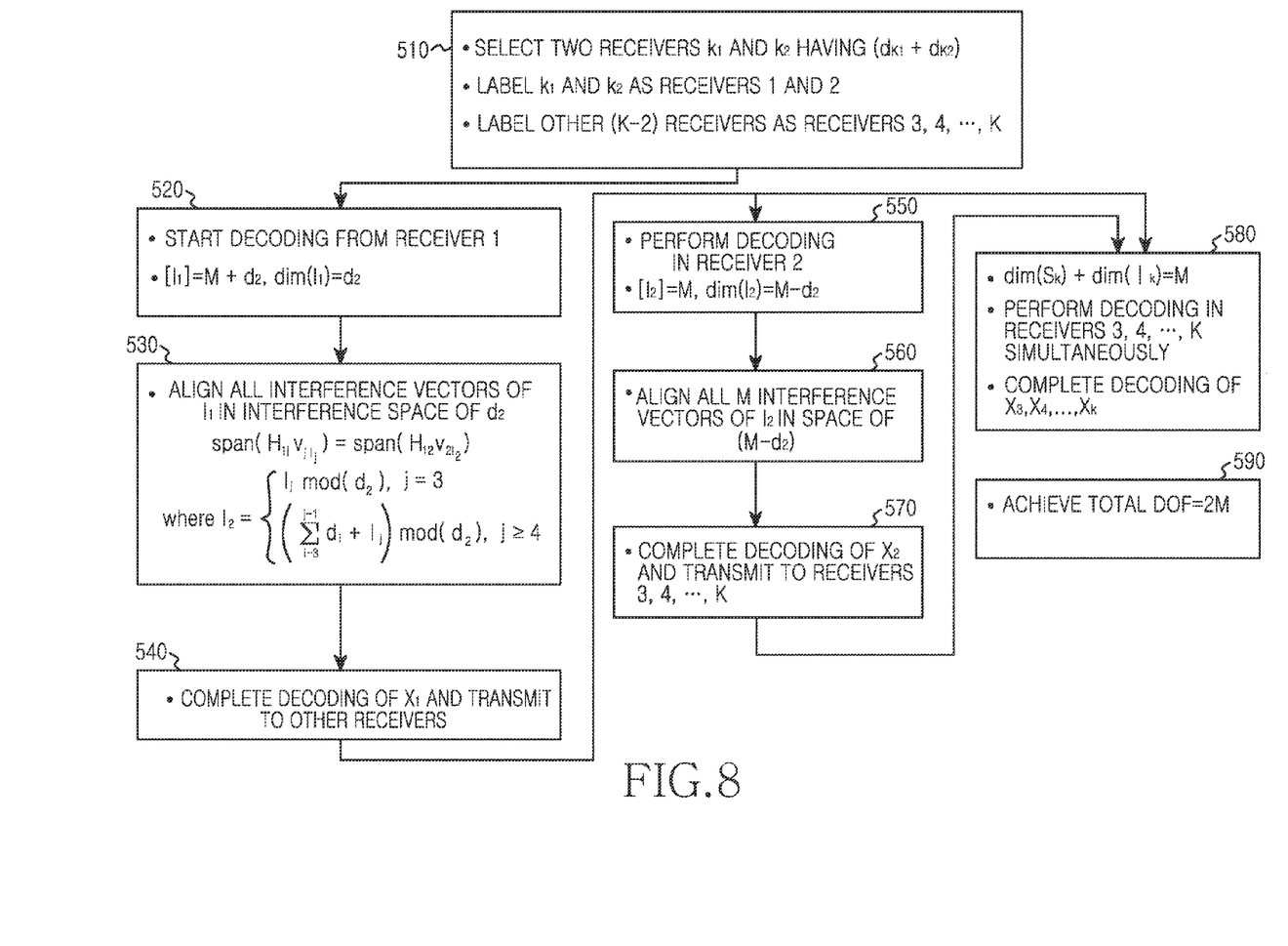
FIG. 8 is a diagram illustrating an operation process for IAC between a transmitter and a receiver according to an exemplary embodiment of the present invention.

FIG. 8 is a diagram illustrating an operational process for an interference alignment and cancellation between a transmitter and a receiver according to an exemplary embodiment of the present invention. By the IAC graph of FIG. 7, in the transmitter/receiver structure, a pre-coding vector is determined according to the design process of FIG. 8, and IAC is performed.

Referring to FIG. 8, two random receivers k1 and k2 having $d_{k_1} + d_{k_2} = M$ are selected in step 510. The selected receivers k1 and k2 are re-labeled as the first receiver and the second receiver, and the other (K−2) receivers are sequentially re-labeled as receivers 3, 4, ..., K.

In step 520, decoding is started from the first receiver and is determined as $|I_1| = M + d_2$. $\dim(I_1) = d_2$. In step 530, all interference vectors in $I_1$ are aligned in an interference space of a $d_2$ dimension. This alignment is determined by Equation (4).

$$\text{span}(H_{1j}v_{jl'_j}) = \text{span}(H_{12}v_{2l'_2}) \quad \text{Equation (4)}$$

$$\text{where } l'_2 = \begin{cases} l_j \bmod(d_2), & j = 3 \\ \left(\sum_{i=3}^{j-1} d_i + l_j\right) \bmod(d_2), & j \geq 4 \end{cases}$$

In step 540, the decoding operation of $X_1$ is completed and the decoding result is transmitted to the other receivers for cancellation.

In step 550, decoding is performed in the second receiver, and it is determined as $|I_2| = M \cdot \dim(I_2) = M - d_2$. In step 560, all M interference vectors in $I_2$ are aligned in an interference space of an (M−$d_2$) dimension. Meanwhile, the alignment scheme should be able to form at most one loop in each independent subgraph.

In step 570, the decoding operation of $x_2$ is completed and the decoding result is transmitted to the other receivers 3, 4, ..., K.

In step 580, a relation of $\dim(S_k) + \dim(I_k) = M$ is established, the receivers 3, 4, ..., K are simultaneously decoded, and decoding of $x_3, x_4, ..., x_K$ is completed. In step 590, DOF=2M is achieved.

According to another exemplary embodiment of the present invention, by selecting a predetermined number of receivers in a TX/RX structure operating in an interference channel by an IAC scheme and transmitting only the detected packets from the receivers to the remaining receivers, the complexity in exchanging the detected packets between the receivers can be reduced below a predetermined level. That is, when the IAC scheme is implemented, since the same TX/RX structure always having a constant complexity without applying a new TX/RX structure whenever the system parameters change can be used, a system providing a low complexity while implementing the maximum possible degree of freedom (2M) can be implemented.

While the invention has been shown and described with reference to certain exemplary embodiments thereof, it will be understood by those skilled in the art that various changes in form and details may be made therein without departing from the spirit and scope of the invention as defined by the appended claims. For example, operations according to exemplary embodiments of the present invention may be recorded in a computer-readable recording medium including a computer command for performing an operation implemented by various computers. The computer-readable recording medium may include program commands, data tiles, and data structures in singularity or in combination. The program commands may be those that are especially designed and configured for the present invention, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording mediums such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. When all or some of a base station or a relay described in the present invention is implemented by a computer program, a computer-readable recording medium storing the computer program is also included in the present invention. Therefore, the scope of the invention is defined not by the detailed description of the invention but by the appended claims, and all differences within the scope will be construed as being included in the present invention.

What is claimed is:

1. An apparatus for Interference Alignment and Cancellation (IAC) in a wireless communication system, the apparatus comprising:
   a plurality of receivers, each receiver including a plurality of antennas configured to receive signals from a plurality of transmitters,
   wherein each of the receivers is configured to:
   detect at least one user signal of multiple user signals and perform a specific interference alignment scheme on the remaining user signals; and
   transmit information about the detected user signal to other receivers to enable the other receivers to cancel the received user signal and perform a user signal detection and a specific interference alignment operation,
   wherein the number of the information about the detected user signal transmitted to other receivers is determined based on a set of the detected user signals, and the number of the remaining user signals being not yet detected.

2. The apparatus of claim 1, wherein the number of the information about the detected user signal transmitted to other receivers is determined based on the following equation:

$$D_k^* = \underset{D_k}{\operatorname{argmin}} C_{sys}(D_1^*, D_2^*, \ldots, D_{k-1}^*, D_k)$$

$$\text{s.t. } \max_{j=1,2,\ldots,J}\{s_u^{[k,j]}\} \le dim(I_k),$$

where $D_k$ denotes the set of signal packets as user signals in a receiver k, $s_u^{[k,j]}$ denotes the number of the signal packets that are not yet detected in the receiver k among the packets transmitted by the user j, and $C_{sys}(D_1, D_2, \ldots, D_{K-1}, D_K)$ denotes the number of packets to be exchanged between the respective receivers.

3. The apparatus of claim 1, wherein the number of receivers is different from the number of transmitters.

4. The apparatus of claim 1, wherein the number of receivers is equal to the number of transmitters.

5. The apparatus of claim 3, wherein the number of antennas of each transmitter is equal to the number of antennas of each receiver.

6. The apparatus of claim 4, wherein the number of antennas of each transmitter is equal to the number of antennas of each receiver.

7. The apparatus of claim 3, wherein the number of antennas of each transmitter is different from the number of antennas of each receiver.

8. The apparatus of claim 4, wherein the number of antennas of each transmitter is different from the number of antennas of each receiver.

9. The apparatus of claim 1, wherein the remaining user signals are aligned through the following equation according to the specific interference alignment scheme:

$$\Phi_k: \{\operatorname{span}(H_{kj}v_{jl_j}) = \operatorname{span}(H_{kp}v_{pl_p}), j \ne p\},$$

where $H_{kj}$ denotes a channel between an antenna of an user j and an antenna of a receiver k, and $v_{jl_j}$ denotes a vector for pre-coding the $l_j$-th packet $x_{jl_j}$ of the user j.

10. The apparatus of claim 1, wherein the remaining user signals for interference alignment are determined based on the following procedures:
   generating IAC graphs including nodes and connection lines;
   searching and selecting an IAC graph having subgraphs, in which nodes in each subgraph constitute up to one loop, among the generated IAC graphs; and
   determining a packet detection and cancellation process from linear equations presented by the selected IAC graph,
   wherein each of the nodes indicates a pre-coding vector, and each of the connection lines indicates whether to perform interference alignment between the pre-coding vectors of the corresponding nodes.

11. A method for Interference Alignment and Cancellation (IAC) in a wireless communication system including a plurality of receivers, each receiver including a plurality of antennas configured to receive signals from a plurality of transmitters, the method comprising:
   by each of the receivers, detecting at least one user signal of multiple user signals and perform a specific interference alignment scheme on the remaining user signals; and
   transmitting information about the detected user signal to other receivers to enable the other receivers to cancel the received user signal and perform a user signal detection and a specific interference alignment operation,
   wherein the number of the information about the detected user signal transmitted to other receivers is determined based on a set of the detected user signals, and the number of the remaining user signals being not yet detected.

12. The method of claim 11, wherein the number of the information about the detected user signal transmitted to other receivers is determined based on the following equation:

$$D_k^* = \underset{D_k}{\arg\min}\, C_{sys}(D_1^*, D_2^*, \ldots, D_{k-1}^*, D_k)$$

$$\text{s.t.} \max_{j=1,2,\ldots,J} \{s_u^{[k,j]}\} \leq dim(I_k),$$

where $D_k$ denotes the set of signal packets as user signals in a receiver k,
$s_u^{[k,j]}$ denotes the number of the signal packets that are not yet detected in the receiver k among the packets transmitted by the user j, and
$C_{sys}(D_1, D_2, \ldots, D_{K-1}, D_K)$ denotes the number of packets to be exchanged between the respective receivers.

13. The method of claim 11, wherein the remaining user signals are aligned through the following equation according to the specific interference alignment scheme:

$$\Phi_k: \{\text{span}(H_{kj}v_{jl_j}) = \text{span}(H_{kp}v_{pl_p}), j \neq p\},$$

where $H_{kj}$ denotes a channel between an antenna of an user j and an antenna of a receiver k, and
$v_{jl_j}$ denotes a vector for pre-coding the $l_j$-th packet $x_{jl_j}$ of the user j.

14. The method of claim 11, further comprising determining the remaining user signals for interference alignment based on the following procedures:
generating IAC graphs including nodes and connection lines;
searching and selecting an IAC graph having subgraphs, in which nodes in each subgraph constitute up to one loop, among the generated IAC graphs; and
determining a packet detection and cancellation process from linear equations presented by the selected IAC graph,
wherein each of the nodes indicates a pre-coding vector, and each of the connection lines indicates whether to perform interference alignment between the pre-coding vectors of the corresponding nodes.

15. The method of claim 14, wherein the searching and selecting of the IAC graph comprises:
searching and selecting an IAC graph, in which nodes in each subgraph constitute up to one loop and which has a transmitter/receiver structure minimizing the number of packets to be exchanged between receivers, among the generated IAC graphs.

16. The method of claim 14, further comprising:
determining a pre-coding vector of a transmitter from the linear equations presented by the selected IAC graph.

17. The method of claim 16, further comprising:
transmitting the determined pre-coding vector to the transmitter.

18. A method for Interference Alignment and Cancellation (IAC) in a wireless communication system, the method comprising:
randomly selecting two receivers from among a plurality of receivers and respectively relabeling the two selected receivers as a first receiver and a second receiver;
relabeling the remaining receivers sequentially;
decoding a first signal and aligning interference vectors in an interference space at the first receiver;
transmitting, by the first receiver, the decoded first signal to the other receivers for cancellation;
decoding a second signal at the second receiver;
transmitting, by the second receiver, the decoded second signal to the other receivers except the first receiver for cancellation; and
decoding remaining signals by the remaining receivers.

19. The method of claim 18, further comprising:
aligning interference vectors in the other interference space excluding the interference space at the second receiver.

* * * * *